United States Patent [19]

Burnham et al.

[11] 4,202,795

[45] May 13, 1980

[54] METHODS AND ADDITIVES FOR DELAYING THE RELEASE OF CHEMICALS IN AQUEOUS FLUIDS

[75] Inventors: John W. Burnham; James E. Briscoe; Eugene A. Elphingstone, all of Duncan, Okla.

[73] Assignee: Halliburton Company, Duncan, Okla.

[21] Appl. No.: 946,471

[22] Filed: Sep. 28, 1978

[51] Int. Cl.$^2$ .............................................. B01D 17/04
[52] U.S. Cl. .................................... 252/332; 252/331; 252/358; 252/8.55 R; 166/308
[58] Field of Search .................. 252/332, 331, 8.55 R, 252/358; 166/308

[56] References Cited

U.S. PATENT DOCUMENTS

| 2,970,959 | 2/1961 | Jones | 252/8.55 B |
| 3,076,508 | 2/1963 | Lissant | 252/8.55 B X |
| 4,033,415 | 7/1977 | Holtmyer et al. | 252/8.55 R X |

FOREIGN PATENT DOCUMENTS 574220  4/1976  U.S.S.R. .................................. 252/331

Primary Examiner—Benjamin R. Padgett
Assistant Examiner—J. Lloyd Barr
Attorney, Agent, or Firm—Thomas R. Weaver; John H. Tregoning; C. Clark Dougherty, Jr.

[57] ABSTRACT

Methods and additives are provided for bringing about the delayed release of a chemical such as a gel breaker or demulsifier in an aqueous fluid. The additives are pelletized solids comprised of the chemical to be released, a hydratable gelling agent and a breaker for the gel produced by the gelling agent when hydrated.

33 Claims, No Drawings

METHODS AND ADDITIVES FOR DELAYING THE RELEASE OF CHEMICALS IN AQUEOUS FLUIDS

This invention relates to methods and additives for bringing about the delayed release of chemicals in aqueous fluids. It more particularly relates to methods and additives for bringing about the delayed demulsification of water-hydrocarbon emulsions and/or the delayed breaking of gelled aqueous fluids utilized in treating subterranean well formations.

Hydraulic fracturing and fracture-acidizing are techniques commonly utilized to stimulate the production of oil and gas from subterranean formations of low permeability. In carrying out such techniques, a fluid is introduced by way of the tubing or casing disposed in a well bore penetrating a formation at a rate and pressure sufficient to produce one or more fractures in the formation and to extend the fractures. The fluid can include a propping agent which is deposited in the fractures and/or the fluid can contain acid so that as the fractures are extended, reactible materials in the formation are consumed.

Heretofore, high viscosity gelled aqueous fluids and high viscosity water-hydrocarbon emulsions have been utilized as fracturing and fracture-acidizing fluids. Such high viscosity fluids are capable of suspending propping agent without excessive settling, bringing about the opening of one or more fractures in the formation to a greater width than is possible with low viscosity fluids and have good fluid loss properties as well as other desirable properties.

After a high viscosity aqueous gel or emulsion has been pumped into a subterranean formation and one or more fractures formed therein, it is desirable to convert the gel or emulsion into a low viscosity fluid, referred to herein as "breaking" the gel or emulsion, so that it can be recovered from the formation through the well bore. While a variety of chemicals which are added to high viscosity fracturing fluids have been utilized for breaking the fluids, hereinafter referred to as "breakers", problems caused by insufficient breaking or the breaking of the fluid too quickly are often experienced. Ideally, a high viscosity fracturing fluid or other well treating fluid has an initial high viscosity, stability during the well treatment and controlled breaking after the treatment. Heretofore, the control of the breaking of gelled aqueous fluids, and particularly water-hydrocarbon emulsions, has been inadequate resulting in less than desirable treatment results and/or clean-up problems after the treatment has been carried out. For example, attempts to use demulsifiers for breaking water-hydrocarbon emulsions have generally been unsuccessful in that rapid or instantaneous breaking of the emulsion takes place when the demulsifier is added thereto decreasing the viscosity of the emulsion.

By the present invention, methods and additives for delaying the release of chemicals such as demulsifiers, gel breakers and the like in aqueous fluids are provided whereby such release is accurately controlled and the desired results achieved. In accordance with the invention, the chemical to be released in an aqueous fluid is combined with a solid hydratable gelling agent and a breaker for the gel formed by the gelling agent when hydrated. The mixture is then formed into prills or pellets, preferably having a size in the range of from about 20 to about 40 mesh (U.S. Sieve Series). Upon combining the pellets with an aqueous fluid into which the chemical is to be released, the gelling agent in the pellets hydrates and forms a protective gel around each of the pellets which prevents the release of the chemical into the aqueous fluid for the time period required for the protective gel to be broken by the gel breaker in the pellets. Once the gel breaker has broken the protective gel, the chemical in the pellets is released into the aqueous fluid. As will be understood, the time required for the protective gel to be broken can be varied by varying the quantities of hydratable gelling agent and gel breaker utilized in the pellets and by using different gelling agents and gel breakers.

A variety of solid hydratable gelling agents can be utilized in accordance with the present invention, such as hydratable polysaccharides, polyacrylamides, polyacrylamide copolymers and polyvinyl alcohol. Particularly preferred hydratable polysaccharides are galactomannan gums and derivatives thereof, glucomannan gums and derivatives thereof, and cellulose derivatives. Examples of such compounds are guar gum, locust beam gum, karaya gum, sodium carboxymethylguar, hydroxyethylguar, sodium carboxymethylhydroxyethylguar, hydroxypropylguar, sodium carboxymethylhydroxymethylcellulose, sodium carboxymethylhydroxyethylcellulose, and hydroxyethylcellulose. The hydroxyethylcellulose derivatives used as gelling agents should be those having between 0.5 and about 10 moles of ethylene oxide per anhydroglucose unit. The most preferred gelling agent for use in accordance with the present invention is hydroxypropylguar.

Breakers for the gels produced by the gelling agents mentioned above when hydrated which are preferred for use in accordance with the present invention are mild oxidizing agents, enzymes, acids and mixtures of such compounds. Examples of particularly suitable oxidizing agents are sodium persulfate and ammonium persulfate. Examples of suitable enzymes which can be utilized are alpha and beta amylases, amyloglucosidase, aligoglucosidase, invertase, maltase, cellulase and hemicellulase. An example of a suitable acid is fumaric acid. Of these, a mixture of sodium persulfate, hemicellulase and cellulase is most preferred.

Any of a variety of chemicals, preferably solid, can be utilized in the additives of the present invention to achieve a desired delayed result in an aqueous fluid. As mentioned above, the additives are particularly suitable for bringing about the delayed demulsification of water-hydrocarbon emulsions and/or the delayed breaking of gelled aqueous fluids utilized in subterranean well formation treatments. Water-hydrocarbon emulsions wherein water, an aqueous acid solution or gelled water or acid solution is the external phase and a hydrocarbon is the internal phase have been utilized in fracturing and fracture-acidizing treatments heretofore. Generally, an emulsifying agent, i.e., a surface active agent, is used to form such water-hydrocarbon emulsions, e.g., alkyl and alkylaryl sulfonates, quaternary ammonium compounds, etc. Such emulsions have high viscosity, low fluid and friction loss properties and are readily pumpable.

In using the pelletized additives of the present invention for delayed demulsification of water-hydrocarbon emulsions, the demulsifying surface active agent utilized in the additives is preferably of opposite charge from the charge of the emulsifying agent used to form the emulsion or nonionic. That is, if an anionic emulsifying agent is utilized in forming the emulsion, the demulsifying agent utilized in the additive of the present invention is preferably either cationic or nonionic. Conversely, if the emulsifying agent is cationic, the demulsifying agent is preferably anionic or nonionic. Examples of suitable cationic surface active agents for demulsifying water-hydrocarbon emulsions are quaternary ammonium salts and amines derived from fatty acids. Examples of anionic demulsifying agents are alcohol sulfates, sulfonates, carboxylates, alcohol ether sulfates and phosphates. Examples of nonionic demulsifying agents which can be utilized are alkoxylated alcohols such as ethylene and/or propylene oxide derivatives of alcohols, alkoxylated phenols, alkoxylated esters and alkoxylated amides. Amphoteric demulsifying agents can also be utilized such as disodium N-tallow, beta-iminodipropionate. In subterranean well formation treatment applications, water-hydrocarbon emulsions formed with cationic emulsifying agents are commonly utilized. In breaking such emulsions, the additives of the present invention preferably include a demulsifying agent selected from the group consisting of solid anionic surface active agents such as sodium lauryl sulfate and solid salts of fatty acids such as sodium stearate.

If the emulsion to be demulsified contains a gelling agent such as the hydratable polysaccharides mentioned above, the additive of the present invention preferably also includes a breaker of the type mentioned above for breaking the gel formed by the gelling agent.

In demulsifying applications, the additive of the present invention is comprised of a solid hydratable gelling agent of the type mentioned above present in the additive in an amount in the range of from about 0.99% to about 98% by weight of the additive, a breaker for the gel produced by the gelling agent when hydrated of the type mentioned above, present in the additive in an amount in the range of from about 0.01% to about 50% by weight of the additive and a demulsifier for demulsifying the particular emulsion to which the additive is combined present in the additive in an amount in the range of from about 1% to about 99% by weight of the additive. As indicated above, the particular quantities of gelling agent and breaker for the gelling agent when hydrated utilized in the additive are varied to achieve the desired delay in releasing the demulsifier into the emulsion.

A more specific preferred additive for demulsifying water-hydrocarbon emulsions is an additive comprised of a hydratable polysaccharide selected from the group consisting of galactomannan gums and derivatives thereof, glucomannan gums and derivatives thereof, cellulose derivatives, and mixtures of such compounds, present in the additive in an amount in the range of from about 20% to about 80% by weight of the additive, a breaker for the gel produced by the gelling agent when hydrated selected from the group consisting of mild oxidizing agents, enzymes, acids and mixtures thereof, present in the additive in an amount in the range of from about 0.1% to about 10% by weight, and a demulsifier present in the additive in an amount of about 20% to about 80% by weight.

The most preferred additive for demulsifying gelled water-hydrocarbon emulsions formed with cationic emulsifying agents is comprised of hydroxypropylguar present in the additive in an amount in the range of from about 40% to about 60% by weight of the additive, a breaker comprised of a mixture of hemicellulase, cellulase and sodium persulfate, the enzymes being present in the additive in an amount in the range of from about 0.25% to about 5.0% by weight, and the sodium persulfate being present in the additive in an amount in the range of from about 1% to about 4% by weight and sodium lauryl sulfate present in the additive in an amount of about 40% to about 60% by weight of the additive.

When the additive of the present invention is utilized for breaking gelled aqueous fluids, such as those formed with cross-linked hydratable polysaccharides, it is comprised of a hydratable gelling agent of the type described above and one or more breakers for breaking both the hydrated gelling agent in the additive and the gelled aqueous fluid. A more specific such additive is comprised of a gelling agent selected from the group consisting of galactomannan gums and derivatives thereof, glucomannan gums and derivatives thereof, cellulose derivatives and mixtures of such compounds present in the additive in an amount in the range of from about 1% to about 99.99% by weight of the additive, and a breaker for the gel produced by the gelling agent upon hydration and for the gelled aqueous fluid selected from the group consisting of mild oxidizing agents, enzymes, acids and mixtures thereof, present in the additive in an amount in the range of from about 0.01% to about 50% by weight of the additive.

The most preferred such additive for bringing about the delayed breaking of gelled aqueous fluids is comprised of hydroxypropylguar present in the additive in an amount in the range of from about 60% to about 98% by weight and a mixture of cellulase and hemicellulase enzymes and sodium persulfate, the enzymes being present in the additive in an amount in the range of from about 1% to about 20% by weight and the sodium persulfate being present in the additive in an amount in the range of from about 1% to about 20% by weight.

As will be understood by those skilled in the art, the additives of the present invention can be utilized for bringing about the delayed release of any of a variety of chemicals in aqueous fluids and is not limited to demulsification or gel breaking applications. For example, the additive of the present invention can be utilized for bringing about the delayed release of a catalyst in an aqueous system for consolidating sand in subterranean well formations. Numerous other uses of the methods and additives of the present invention will be readily apparent to those skilled in the art in applications where aqueous fluids are utilized.

While the additives of this invention can be formed into prills or pellets using a variety of techniques, a presently preferred technique is to mix the various ingredients utilized in the additive, followed by compacting the mixture and extruding it through a die having a small opening therein, preferably about 1/16 inch in diameter. The compacted and extruded material is then cut into lengths of approximately 1/16 inch and screened to obtain pellets of a size in the range of from about 10 to about 40 mesh, most preferably from about 10 to about 18 mesh (U.S. Sieve Series). Such pellets are readily dispersed in aqueous fluids and form the protective gel required to delay the release of a chemical contained therein for a desired time period.

In carrying out the method of the present invention for delaying the release of a demuslifying agent in a water-hydrocarbon emulsion, the demulsifying agent utilized is mixed with a solid hydratable gelling agent and a breaker for the protective gel produced by the gelling agent when hydrated and then formed into solid pellets of the size indicated above. The pellets are added or combined with the water-hydrocarbon emulsion and the gelling agent in the pellets is hydrated forming a protective gel around each of the pellets for the period of time required for the protective gel to be broken by the breaker in the pellets whereupon the demulsifying agent is released into the emulsion.

In carrying out the method of the present invention for breaking gelled aqueous fluids, a breaker for the gelled aqueous fluid is mixed with a solid hydratable gelling agent and a breaker for the gelling agent when hydrated and formed into pellets. As will be understood, depending on the particular gelled aqueous fluid to be broken, separate breakers for the gelled aqueous fluid and for the hydrated gelling agent can be included in the pellets or a single breaker can be included which breaks both the gelled aqueous fluid and the hydrated gelling agent.

In applications for hydraulic fracturing and/or fracture-acidizing fluids, the type of breaker used and the quantity of breaker included in the pellets is preferably such that complete breaking of the fluids takes place when pellets are combined with the fluids in an amount in the range of from about 0.005% to about 0.5% by weight of the fluid.

As will be understood, the surface area of the pellets utilized in a particular application as well as the compaction of the blended chemicals therein can be varied to vary the rate of release of the chemicals.

The following examples are given to further illustrate the present invention.

the aqueous gel in an amount of 0.5% by volume while slowly stirring the aqueous gel in the Waring blender. Kerosene is added to the aqueous gel in an amount of 2 times the volume of the aqueous gel and the mixture is pumped through a JABSCO self-priming pump Model 4270—½ inch standard for one minute at a temperature of 80° F. to form the emulsion.

An additive of the present invention is prepared by mixing hydroxypropylguar in an amount of 48.75% by weight of the additive, sodium lauryl sulfate in an amount of 48.75% by weight of the additive, hemicellulase enzyme in an amount of 0.5% by weight of the additive, and sodium persulfate in an amount of 2.0% by weight of the additive. The mixture is compacted and extruded through a 1/16 inch die. The extruded material is then cut into lengths of approximately 1/16 inch and screened to obtain pellets of a size in the range of from about 10 to about 18 mesh (U.S. Sieve Series).

Portions of the aqueous gel-kerosene emulsion are placed in a modified heating cup with a pulley driven propeller for stirring, and the pelletized additive combined therewith in the amounts given in Table I below. The apparent viscosities of the emulsion at the temperatures indicated are measured with a Model 35 FANN viscometer at the time intervals indicated to determine when the emulsion is broken by the additive.

The Model 35 FANN viscometer is equipped with a No. 1 spring, standard bob and sleeve and is operated at 300 rpm. The results of these tests are given in Table I below.

TABLE I

DELAYED BREAKING OF AQUEOUS GEL-KEROSENE EMULSION FORMED WITH ALKYL TRIMETHYL AMMONIUM CHLORIDE AT VARIOUS TEMPERATURES

| Quantity of Additive Combined with Emulsion, Pounds/1000 Gal Emulsion | Temperature of Emulsion, °F. | Apparent Viscosity (CP)/Elapsed Time | | | | | | | | |
|---|---|---|---|---|---|---|---|---|---|---|
| | | 0 | 5 min. | 10 min. | 15 min. | 30 min. | 60 min. | 90 min. | 120 min. | 24 hr.[1] |
| 12 | 80 | 180 | 167 | 163 | 153 | 142 | 139 | 142 | 125 | 7 |
| 7 | 130 | 195 | 165 | 148 | 137 | 113 | 101 | 96 | 83 | 2 |
| 6.5 | 180 | 185 | 147 | 131.5 | 118 | 86.5 | 68 | 62.3 | 57 | 2 |

[1]Viscosity of aqueous gel phase from broken emulsion.

EXAMPLE 1

In the laboratory, aqueous gel-hydrocarbon emulsions are prepared by first preparing gelled water by mixing tap water containing 1% by weight potassium chloride with guar gum in an amount of 50 lbs. per 1000 gallons of water and sodium hydrogen phosphate in an amount of 10 lbs. per 1000 gallons of water. The mixture is continuously stirred in a Waring blender and allowed to hydrate for 30 minutes. An emulsifying agent, i.e., alkyl trimethyl ammonium chloride (50 weight percent active in isopropyl alcohol/water/solvent) is added to

EXAMPLE 2

The procedure of Example 1 is repeated except that emulsions are formed using the quantities of kerosene given in Table II below.

TABLE II

DELAYED BREAKING OF AQUEOUS GEL-KEROSENE EMULSIONS FORMED WITH ALKYL TRIMETHYL AMMONIUM CHLORIDE AND VARIOUS AMOUNTS OF KEROSENE AT 130° F.

| Quantity of Additive Combined with Emulsion, Pounds/1000 Gal. Emulsion | Volume Percent Kerosene Used in Emulsion | 0 | 5 min. | 10 min. | 15 min. | 30 min. | 60 min. | 90 min. | 120 min. | 24 hr.[1] |
|---|---|---|---|---|---|---|---|---|---|---|
| 9 | 60 | 140 | 121 | 114 | 110 | 98.5 | 86 | 79 | 74 | 2 |
| 5.5 | 75 | 233 | 190 | 169 | 154 | 144 | 135 | 125 | 120 | 2 |

[1]Viscosity of aqueous gel phase from broken emulsion.

EXAMPLE 3

The procedure described in Example 1 is repeated except that the emulsifying agent used in forming the emulsion is alkyl trimethyl ammonium chloride containing a lower active concentration in the solvent. The results of these tests are given in Table III.

TABLE III

DELAYED BREAKING OF AQUEOUS GEL-KEROSENE EMULSION FORMED WITH ALKYL TRIMETHYL AMMONIUM CHLORIDE AT VARIOUS TEMPERATURES

| Quantity of Additive Combined with Emulsion, Pounds/1000 Gal Emulsion | Temperature of Emulsion, °F. | \multicolumn{9}{c}{Apparent Viscosity (CP)/Elapsed Time} | | | | | | | | |
|---|---|---|---|---|---|---|---|---|---|---|
| | | 0 | 5 min. | 10 min. | 15 min. | 30 min. | 60 min. | 90 min. | 120 min. | 24 hr.[1] |
| 6.5 | 80 | 150 | 141 | 140.5 | 139.5 | 137 | 133.5 | 132.5 | 127 | 10 |
| 4.0 | 130 | 150 | 127 | 123 | 118 | 106 | 92 | 43 | 43 | — |
| 3.5 | 180 | 150 | 122 | 110 | 109 | 74 | 60 | 51 | 10 | 5 |

[1]Viscosity of aqueous gel phase from broken emulsion.

From the results of the tests shown in Tables I, II and III, it can be seen that the pelletized additives of the present invention effectively bring about the delayed breaking of aqueous gel-kerosene emulsions at various temperatures.

EXAMPLE 4

The procedure described in Example 1 is repeated except that the pelletized additive is comprised of guar gum in an amount of 30% by weight of the additive, sodium lauryl sulfate in an amount of 60% by weight, and a mixture of hemicellulase and cellulase enzyme, the mixture present in an amount of 1.0% by weight and 9.0% by weight inert ingredients.

Portions of the aqueous gel-kerosene emulsion described in Example 1 are placed in a stirring apparatus and viscosities are measured at time intervals with a Model 35 FANN viscometer for the emulsion alone, the emulsion with sodium lauryl sulfate combined therewith and the emulsion with the pelletized additive of this invention combined therewith, all at 80° F. The results of these tests are shown in Table IV.

TABLE IV

COMPARISON OF ADDITIVE OF THE PRESENT INVENTION WITH DEMULSIFIER ALONE AND NO DEMULSIFIER

| Quantity of Additive or Demulsifier Added to Emulsion, Pounds/1000 Gal. Emulsion | Ingredient Added | Apparent Viscosities (CP)/Elapsed Time | | | | | |
|---|---|---|---|---|---|---|---|
| | | 0 | ½ hr. | 1 hr. | 2 hrs. | 4 hrs. | 24 hrs. |
| 13.3 | Pelletized Additive | 165 | 155 | 146 | 136 | 131 | Broken |
| 8.0 | Demulsifier | 77 | Breaking | Broken | | | |
| No demulsifier | | 160 | 170 | 171 | 168 | 170 | 170 |

From Table IV it can be seen that the pelletized additive of the present invention effectively brings about the delayed breaking of an aqueous gel-kerosene emulsion as compared to demulsifiers alone.

What is claimed is:

1. A method of delaying the release of a chemical in an aqueous fluid comprising the steps of:
    mixing said chemical with a solid hydratable gelling agent and a breaker for the gel produced by said gelling agent when hydrated;
    forming the resultant mixture into solid pellets; and
    combining said pellets with said aqueous fluid whereby said gelling agent in said pellets is hydrated and forms a protective gel around said pellets for the period of time required for said protective gel to be broken by said breaker in said pellets whereupon said chemical is released into said aqueous fluid
    wherein said gelling agent is selected from hydratable polysaccharides, polyacrylamides, polyacrylamide copolymers and polyvinyl alcohol,
    said gelling agent being present in said mixture in an amount in the range of from about 0.99 to about 99.99 percent by weight of said mixture, and
    wherein said breaker for said gel is selected from mild oxidizing agents, enzymes, acids and mixtures thereof,
    said breaker for said gel being present in an amount in the range of from about 0.01 to about 50 percent by weight of said mixture and still further
    wherein said chemical is present in said mixture in an amount in the range of from about 1 to about 99 percent by weight of said mixture.

2. The method of claim 1 wherein said aqueous fluid is a gelled aqueous fluid and said chemical is a breaker for said gelled aqueous fluids.

3. The method of claim 2 wherein said chemical and said breaker for the gel produced by said gelling agent are the same compound or the same mixture of compounds.

4. The method of claim 3 wherein said hydratable gelling agent is a hydratable polysaccharide selected from the group consisting of galactomannan gums and derivatives thereof, glucomannan gums and derivatives thereof, cellulose derivatives, and mixtures of such compounds.

5. The method of claim 4 wherein said gelling agent is present in said mixture in an amount in the range of from about 1% to about 99.99% by weight of said mixture and said chemical and breaker for the gel produced by said gelling agent is present in said mixture in an amount in the range of from about 0.01% to about 50% by weight of said mixture.

6. The method of claim 5 wherein said hydratable gelling agent is hydroxypropylguar present in said mixture in an amount in the range of from about 60% to about 98% by weight and said chemical and breaker for the gel produced by hydroxypropylguar when hydrated is sodium persulfate and an enzyme blend of cellulase and hemicellulase, the said enzymes being present in said mixture in an amount in the range of from about 1% to about 20% by weight of said mixture and the sodium persulfate being present in said mixture in an amount in the range of from about 1% to about 20% by weight of said mixture.

7. The method of claim 6 wherein said pellets are combined with said aqueous fluid in an amount in the range of from about 0.005% to about 0.5% by weight of said aqueous fluid.

8. The method of claim 1 wherein said aqueous fluid is a water-hydrocarbon emulsion and said chemical is a demulsifier for said emulsion.

9. The method of claim 1 wherein said aqueous fluid is a water-hydrocarbon emulsion, said hydratable gelling agent is a hydratable polysaccharide selected from the group consisting of galactomannan gums and derivatives thereof, glucomannan gums and derivatives thereof, cellulose derivatives, and mixtures of such compounds, and said chemical is a demulsifier for said emulsion.

10. The method of claim 9 wherein said gelling agent is present in said mixture in an amount in the range of from about 0.99% to about 98% by weight of said mixture.

11. The method of claim 9 wherein said water-hydrocarbon emulsion includes a cationic surface active emulsifier and said demulsifier is an anionic or nonionic surface active agent.

12. The method of claim 9 wherein said water-hydrocarbon emulsion includes an anionic surface active emulsifier and said demulsifier is a cationic or nonionic surface active agent.

13. The method of claim 9 wherein said hydratable gelling agent is present in said mixture in an amount in the range of from about 20% to about 80% by weight of said mixture, said breaker for the gel produced by said hydratable gelling agent when hydrated is present in an amount in the range of from about 0.1% to about 10% by weight of said mixture and said demulsifier is present in an amount in the range of from about 20% to about 80% by weight of said mixture.

14. The method of claim 13 wherein said hydratable gelling agent is hydroxypropylguar present in said mixture in an amount in the range of from about 40% to about 60% by weight of said mixture, said breaker for the gel produced by hydroxypropylguar when hydrated is sodium persulfate and an enzyme blend of cellulase and hemicellulase, said enzymes being present in said mixture in an amount in the range of from about 0.25% to about 5.0% by weight of said mixture, said sodium persulfate being present in said mixture in an amount in the range of from about 1% to about 4% by weight of said mixture, and said demulsifier is sodium lauryl sulfate present in said mixture in an amount in the range of from about 40% to about 60% by weight of said mixture.

15. A method of bringing about the delayed demulsification of a water-hydrocarbon emulsion comprising combining with said emulsion a quantity of solid pellets comprised of a demulsifier for said emulsion, a solid hydratable gelling agent and a breaker for the gel produced by said gelling agent when hydrated whereby said gelling agent is hydrated and forms a protective gel around each of said pellets for the period of time required for said protective gel to be broken by said breaker whereupon said demulsifier is released into said emulsion wherein said gelling agent is selected from hydratable polysaccharides, polyacylamides, polyacrylamide copolymers and polyvinyl alcohol, said gelling agent being present in said mixture in an amount in the range of from about 0.99 to about 99.99 percent by weight of said mixture, and wherein said breaker for said gel is selected from mild oxidizing agents, enzymes, acids and mixtures thereof, said breaker for said gel being present in an amount in the range of from about 0.01 to about 50 percent by weight of said mixture and still further wherein said demulsifier is present in said mixture in an amount in the range of from about 1 to about 99 percent by weight of said mixture.

16. The method of claim 15 wherein said hydratable gelling agent is selected from the group consisting of galactomannan gums and derivatives thereof, glucomannan gums and derivatives thereof, cullulose derivatives, and mixtures of such compounds.

17. The method of claim 16 wherein said gelling agent is present in said pellets in an amount in the range of from about 0.99% to about 98% by weight, said breaker is present in said pellets in an amount in the range of from about 0.01% to about 50% by weight of said pellets, and said demulsifier is present in said pellets in an amount in the range of from about 1% to about 99% by weight of said pellets.

18. The method of claim 17 wherein said water-hydrocarbon emulsion includes an anionic surface active emulsifier and said demulsifier is a cationic or nonionic surface active agent.

19. The method of claim 16 wherein said water-hydrocarbon emulsion includes a cationic surface active emulsifier and said demulsifier is an anionic or nonionic surface active agent.

20. The method of claim 16 wherein said hydratable gelling agent is hydroxypropylguar present in said pellets in an amount of from about 40% to about 60% by weight of said pellets, said breaker for the gel produced by hydroxypropylguar when hydrated is sodium persulfate and an enzyme blend of cellulase and hemicellulase, said enzymes being present in said pellets in an amount in the range of from about 0.25% to about 5.0% by weight of said pellets, said sodium persulfate being present in said pellets in an amount in the range of from about 1% to about 4% by weight of said pellets, and said demulsifier is sodium lauryl sulfate, present in said pellets in an amount in the range of from about 40% to about 60% by weight of said pellets.

21. The method of claim 17 wherein said pellets are combined with said water-hydrocarbon emulsion in an amount in the range of from about 0.005% to about 0.5% by weight of said water-hydrocarbon emulsion.

22. A method of bringing about the delayed breaking of a gelled aqueous fluid comprising combining with said fluid a quantity of solid pellets comprised of a solid hydratable gelling agent and a breaker for said gelled aqueous fluid and for the gel produced by said gelling agent when hydrated whereby said gelling agent in said pellets is hydrated and forms a protectige gel around each of said pellets for the period of time required for said protective gel to be broken by the breaker in said pellets whereupon said breaker is released into said gelled aqueous fluid wherein said gelling agent is selected from hydratable polysaccharides, polyacrylamides, polyacrylamide copolymers and polyvinyl alcohol, said gelling agent being present in said mixture in an amount in the range of from about 0.99 to about 99.99 percent by weight of said mixture, and wherein said breaker for said gel is selected from mild oxidizing agents, enzymes, acids and mixtures thereof, said breaker for said gel being present in an amount in the range of from about 0.01 to about 50 percent by weight of said mixture.

23. The method of claim 22 wherein said hydratable gelling agent is selected from the group consisting of galactomannan gums and derivatives thereof, glucomannan gums and derivatives thereof, cellulose derivatives and mixtures of such compounds.

24. The method of claim 23 wherein said gelling agent is hydroxypropylguar present in said pellets in an amount in the range of from about 60% to about 98% by weight of said pellets and said breaker for said gelled aqueous fluid and the gel produced by said gelling agent when hydrated is sodium persulfate and an enzyme blend of cellulase and hemicellulase, said enzymes being present in said pellets in an amount in the range of from about 1% to about 20% by weight of said pellets and said sodium persulfate being present in said pellets in an amount in the range of from about 1% to about 20% by weight of said pellets.

25. The method of claim 24 wherein said pellets are combined with said gelled aqueous fluid in an amount in the range of from about 0.005% to about 5% by weight of said gelled aqueous fluid.

26. A pelletized additive for bringing about the delayed release of a chemical in an aqueous fluid comprised of said chemical, a solid hydratable gelling agent and a breaker for the gel produced by said gelling agent when hydrated wherein said gelling agent is selected from hydratable polysaccharides, polyacrylamides, polyacrylamide copolymers and polyvinyl alcohol, said gelling agent being present in said mixture in an amount in the range of from about 0.99 to about 99.99 percent by weight of said mixture, and wherein said breaker for said gel is selected from mild oxidizing agents, enzymes, acids and mixtures thereof, said breaker for said gel being present in an amount in the range of from about 0.01 to about 50 percent by weight of said mixture and still further wherein said chemical is present in said mixture in an amount in the range of from about 1 to about 99 percent by weight of said mixture.

27. The pelletized additive of claim 26 wherein said hydratable gelling agent is a hydratable polysaccharide selected from the group consisting of galactomannan gums and derivatives thereof, glucomannan gums and derivatives thereof, cellulose derivatives, and mixtures of such compounds.

28. The pelletized additive of claim 27 wherein said chemical is a demulsifier.

29. The pelletized additive of claim 27 wherein said chemical is a gel breaker.

30. The pelletized additive of claim 28 wherein said hydratable gelling agent is hydroxypropylguar present in said additive in an amount in the range of from about 20% to about 80% by weight, said breaker for the gel produced by hydroxypropylguar when hydrated is sodium persulfate and an enzyme blend of cellulase and hemicellulase, said enzymes being present in said additive in an amount in the range of from about 0.1% to about 10% by weight, and said chemical is sodium lauryl sulfate, present in an amount in the range of from about 20% to about 80% by weight.

31. A pelletized additive for bringing about the delayed breaking of a gelled aqueous fluid comprising a hydratable gelling agent and a breaker for the hydratable gelling agent when hydrated and for said gelled aqueous fluid wherein said gelling agent is selected from hydratable polysaccharides, polyacrylamides, polyacrylamide copolymers and polyvinyl alcohol, said gelling agent being present in said mixture in an amount in the range of from about 0.99 to about 99.99 percent by weight of said mixture, and wherein said breaker for said gel is selected from mild oxidizing agents, enzymes, acids and mixtures thereof, said breaker for said gel being present in an amount in the range of from about 0.01 to about 50 percent by weight of said mixture.

32. The pelletized additive of claim 31 wherein said gelling agent is a hydratable polysaccharide selected from the group consisting of galactomannan gums and derivatives thereof, glucomannan gums and derivatives thereof, cellulose derivatives, and mixtures of such compounds.

33. The pelletized additive of claim 32 wherein said hydratable gelling agent is hydroxypropylguar present in said additive in an amount in the range of from about 40% by weight to about 60% by weight and said breaker for the gel produced by hydroxypropylguar and for said gelled aqueous fluid is a mixture of sodium persulfate and an enzyme blend of cellulase and hemicellulase, said enzymes being present in said additive in an amount in the range of from about 0.25% to about 5% by weight and said sodium persulfate being present in said additive in an amount in the range of from about 1% to about 4% by weight.

* * * * *